June 2, 1936.　　　A. E. HERRON　　　2,042,940
ICE CREAM APPARATUS
Filed Oct. 17, 1932
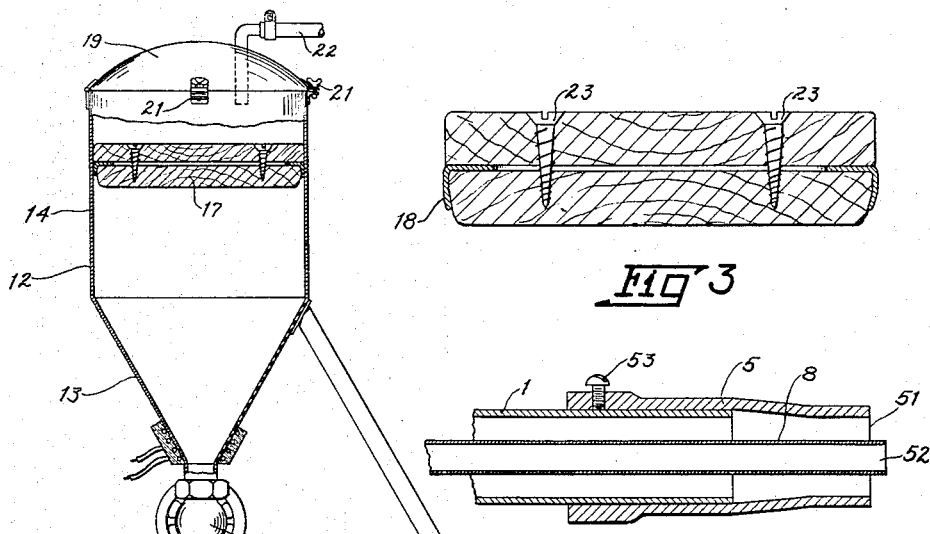
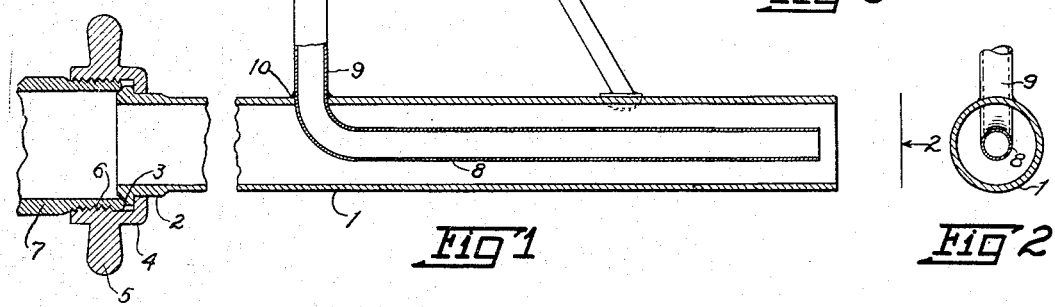
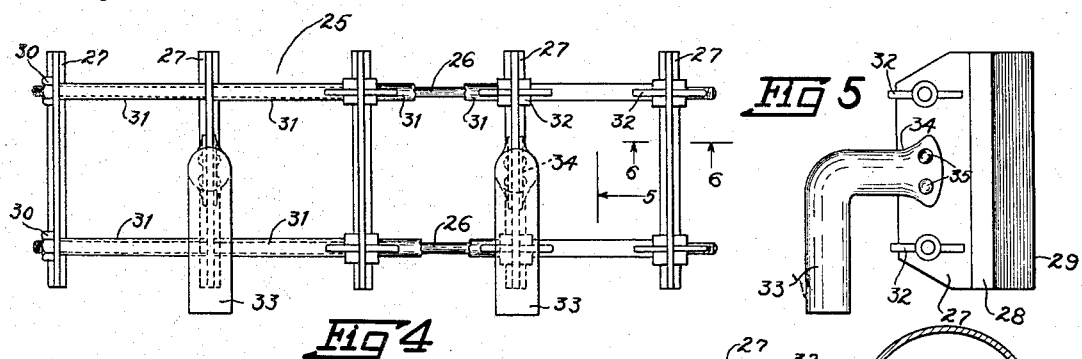
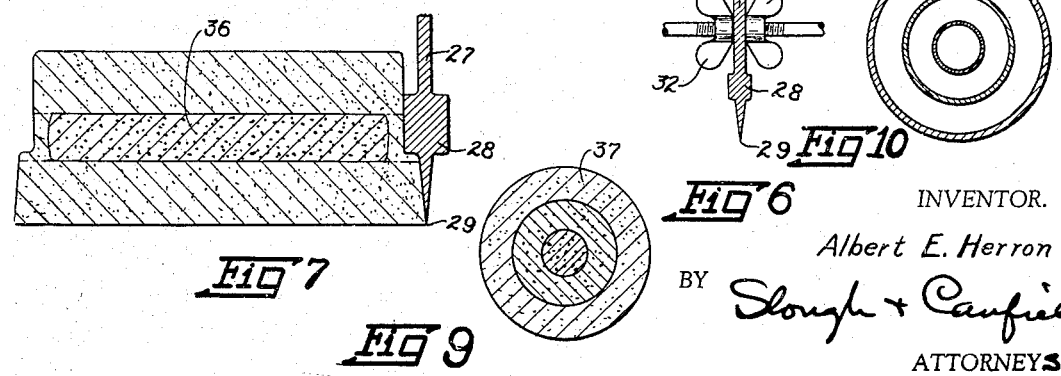
INVENTOR.
Albert E. Herron
BY Slough & Canfield
ATTORNEYS.

Patented June 2, 1936

2,042,940

UNITED STATES PATENT OFFICE 2,042,940

ICE CREAM APPARATUS

Albert E. Herron, Cleveland, Ohio, assignor, by mesne assignments, to Vogt Processes, Inc., Louisville, Ky., a corporation of Delaware Application October 17, 1932, Serial No. 638,084

6 Claims. (Cl. 107—1)

This invention pertains to methods and apparatus for forming ice cream confections or the like, and more particularly to apparatus adapted to provide a continuous supply of frozen confection units.

Ice cream confections of various kinds have heretofore been formed comprising an interior body of ice cream with an external coating of flavoring matter of various kinds; also, confections of other kinds have been formed by removing material from the interior of a confection body and replacing the removed portions with a substituted confection material.

I have provided a method of forming a confection wherein a liquid syrup or similar flavoring material my be pocketed internally of the bar of ice cream, thus permitting various tasteful confections to be formed where a syrup is combined with the cream and handled as a marketable unit, which could not be done if the syrup were applied externally of the cream.

It is an object of my invention, therefore, to provide a method of forming a quantity of syrup internally of a tube of frozen ice cream or the like.

Another object of my invention is to provide a method of continuously supplying confection units comprising ice cream and liquid flavoring material.

Another object is to provide a method of entrapping a quantity of liquid flavoring syrup in a tube of ice cream or the like.

Another object of my invention is to provide a method providing a confection comprising ice cream and liquid flavoring extract deposited therein, wherein the relative proportions of the ice cream and the liquid flavoring medium may be controlled.

Another object of my invention is to provide an improved means of dividing a relatively long tube of frozen confection having a liquid flavoring material deposited internally thereof into relatively short sealed units.

Another object of my invention is to provide an apparatus designed to accomplish the above mentioned functions.

Other objects of my invention, and the invention itself, will become increasingly apparent from a consideration of the following description and drawing wherein like characters are referred to by like reference numerals, and wherein:

Fig. 1 is a side elevational view, partially broken away, of a preferred embodiment of my invention;

Fig. 2 is a partial end elevational view of the embodiment illustrated in Fig. 1;

Fig. 3 is a medial sectional view of a float type liquid seal which I may employ;

Fig. 4 is a plan view of a cutter which I may employ;

Fig. 5 is an end elevational view of Fig. 4;

Fig. 6 is a fragmentary elevational view showing the method of adjusting the cutter; taken along the lines 6—6 of Fig. 4;

Fig. 7 is a view illustrating the manner of sealing the confection roll at the end, and incidentally illustrates the resultant article;

Fig. 8 is a modification of Fig. 1;

Fig. 9 is a transverse sectional view of an article which is another embodiment of my invention; and Fig. 10 is a transverse sectional view of a concentric tube arrangement which is another embodiment of the apparatus illustrated in Fig. 1, the view being considered as taken near the discharge ends of the concentric confection supply tubes.

Referring to the drawing, I have indicated at 1 a preferably cylindrical tube formed of any suitable material such as metal, the tube being relatively thickened at one end thereof, as indicated at 2, the portion 2 terminating in an outwardly extending radial flange 3.

A cap 4 is provided with a central perforation at the bottom thereof and is adapted to loosely engage the thickened portion 2 of the tube 1 and abut the inner face of the flange 3. The cap 4 is preferably provided with rotative means such as the handle 5 and is internally threaded as indicated at 6, whereby it may be secured to a pipe 7, the pipe 7 leading to any suitable device for supplying ice cream under pressure to the tube 1. The tube 1 is preferably of substantially the same internal diameter as the pipe 7, as shown in Fig. 1.

Though I have shown a specific means connecting pipe 7 and tube 1, it is understood that any desired method may be employed, and further that any method well known in the art of supplying and controlling the pressure and supply of the ice cream may be used.

The tube 1 may be rigidly secured to any suitable supporting means in various ways, well understood, and since this constitutes no essential part of my invention the securing means is not shown.

Coaxially aligned with the tube 1 and disposed internally thereof for a major portion of the tube length is a relatively small preferably metal tube 8, the tube 8 being bent to provide a portion 9 projected through a perforation in the tube 1 and extending substantially at right angles to tube 1.

The tube 8 may be rigidly and sealingly secured to the tube 1 in any suitable manner such as welding, as indicated at 10. Normally the portion 9 of the tube 8 will be thus extending in a vertical upward direction. The upper end of the tube portion 9 threadedly engages a liquid control valve 11, which may be any desired manually operable valve adapted to control a relatively sticky fluid such as syrup.

Disposed above the control valve 11 is a hopper, generally indicated at 12, comprising a conical portion 13 sealingly engaging the control valve and an integral upper cylindrical portion 14. The conical portion 13 of the hopper may be secured to the control valve 11 in any suitable manner, such as by threadedly engaging the inlet portion of the valve.

Various syrups of differing degrees of consistency will be contained in the hopper to flow through the valve 11, and further the syrup will be subjected to varying temperature conditions. To insure that the syrup extract will be of proper consistency permitting ease of flow, a heating unit which may take the form of electrical resistance elements encircling the lower portion of the cone 13 of the hopper may be employed.

It will be understood that with some kinds of syrup such heating means may not be required, and that when a material such as honey is employed, which may require heating, any heating means may be utilized, and further that the heating means may be placed in any suitable location, such as encircling the valve rather than the hopper proper.

I provide a brace which may comprise a pipe 16 weldingly secured at one end to the hopper and at its opposite end to the tube 1, and preferably extending divergently to insure a relatively greater bracing action.

The hopper 12 is adapted to contain the syrup supply which will flow by gravity through the control valve 11 and thence through tube 8. The control valve may be manipulated so that any desired quantity of syrup may be permitted to pass therethrough in a given time. I preferably provide a sealed float 17 comprising a circular disk provided with a sealing means such as a rubber cup 18. The top of the hopper is preferably protected by a disk shaped cover 19 hingingly secured to the hopper as indicated at 20, and provided with a snap lock 21 insuring that no foreign substance will penetrate to the interior of the hopper. I further provide a suitable vent 22 which may comprise a pipe or the like, permitting the float seal 17 to always be subjected to atmospheric pressure.

The float 17 not only provides a secondary means of insuring that foreign substance will not penetrate into the syrup, but further insures that the tendency of air to be filtered through with the syrup be eliminated.

As illustrated in Fig. 3, the rubber cup 18 may be secured to the float 17 by forming the float of two circular preferably wooden plates secured together by screws 23, the inturned flanged cup 18 being secured between the contiguous faces of the float plates.

Although I have illustrated a gravity feed arrangement for forcing syrup through the tube 8, any suitable means such as a pressure supplying device may be employed to subject the syrup to pressure.

In operating the device, ice cream under pressure is forced through the tube 1, and upon reaching the curved portion of the tube 8 will be forced therearound and will emerge at the end of tube 1 with a centrally cored portion caused by the tube 8. As the cylinder of ice cream emerges from the end of the tube, the pressure thereon is relieved and it tends to expand. To prevent the liquid syrup which is introduced to the cored portion of the cream from deforming the plastic tube of ice cream, the syrup is introduced into the cored portion of the ice cream tube at a point where the syrup pressure is slightly less than the ice cream pressure. To this end, syrup containing tube 8 preferably terminates slightly inwardly of the end of the tube 1 whereby the plastic tube of ice cream will be maintained in a normal undeformed state. By terminating the tube 8 relatively close to the end of tube 1, there will furthermore be no opportunity for the pressure of the ice cream to close the cored portion of the plastic ice cream tube, thereby causing the syrup to be forced backwardly into tube 8, prior to emergence of the ice cream from tube 1. Thus, a substantially cylindrical tube of ice cream or the like containing a centrally cored portion filled with a liquid flavoring medium such as syrup, will emerge from the tube 1 and be forced along a table or other suitable supporting means.

Suitable pressure controlling means may be provided for controlling the pressures of the introduced ice cream and syrup, whereby the syrup at the mouth of the inner tube 8 may be maintained at substantially the same hydrostatic pressure as is exerted at that point at that time by the ice cream body material encircling the said second tube mouth.

It will be understood that in claiming my invention that I contemplate employing pressures of the two fluids sufficiently near the same value that the formation of the walls of the ice cream core will not be undesirably deformed.

Inasmuch as the effect of any given pressures of the syrup and ice cream at the ends of the tubes 8 and 1 depends, as above described, upon the relative positions of these ends, I may provide the means illustrated in Fig. 8 to adjustably vary the relative positions. The end of the tube 1 may have a sleeve 50 telescoped thereover as a continuation thereof and the position of its end 51 relative to the end 52 of the tube 8 may be varied to secure the desired pressure relation by axially shifting the sleeve and fixing it in the suitable position by a set screw 53.

It will be obvious that at the outer end of the tube 1, the ice cream is at atmospheric pressure and proceeding inwardly from the end the pressure increases so that if the end of the tube 8 is moved inwardly of the end of the tube 1 it is progressively subjected to increasing ice cream pressure. Thus, by adjusting the relative positions of the ends of the tubes 1 and 8, a balance of pressures at the end of the inner tube 8 may be attained.

To divide this continuous tube into relatively small units, having the ends sealed to trap the syrup contained therebetween, I provide the following described cutter.

The cutter, generally designated at 25, comprises spaced parallel threaded rods 26—26 having a plurality of cutting blades 27 secured transversely of the rods in parallel relation. The blades 27 which are preferably formed of steel comprise a generally rectangular shaped plate, the upper portion being perforated at two spaced points whereby the blades may loosely engage the threaded rods 26. The bottom portion of the blades 27 is relatively thickened on each face thereof, as indicated at 28, to provide a shoulder above a knife edge 29.

I preferably secure one of the end blades by means of nuts 30—30, which abut the outer face of the blades, the inner face of the blades being tightly engaged by tubular pipe spacers 31, which are telescoped over the rods 26. Any desired number of spacers 31 may be employed when it is desired to provide a constant length of confection unit. Pressure may be exerted upon the blades abutting the opposite end of the spacers by means of wing nuts 32 threadedly engaging the rods 26, and the blade faces. Thus any intermediately disposed blades will be rigidly secured longitudinally, by means of oppositely directed pressure exerted by the spacing tubes 31.

In order to provide a means of supplying varying lengths of confection units, I provide a means of adjustably securing some of the blades longitudinally relative to the rods 26, and this may be accomplished as indicated in Fig. 6, by means of wing nuts disposed on each face of the blades 27 whereby the blades may be adjustable longitudinally.

To provide for easy manipulation of the cutter, I provide handles 33 generally L-shaped, and formed of any suitable material, and preferably tubular. The downwardly projecting arm of the handle is slotted, as indicated at 34, to receive the upper portion of the blade 27, the blade being rigidly secured to the handle by means of rivets 35, preferably two for each handle, which threadedly engage the handle and blade.

In operating the cutter, after a predetermined length of tubular shaped ice cream containing syrup or flavoring extract in the cored portion thereof, has been forced from the end of the tube 1 upon a table or the like, the cutter 25 is forced downwardly by means of handles 33 to provide a plurality of confection units of predetermined length. The underface of the shoulders 28, as most clearly illustrated in Fig. 7, will force the end portions of the tubular ice cream units downwardly and effectively seal the ends, thus pocketing within the tubular ice cream or the like the intermediately contained quantity of syrup or the like.

Thus I have provided a method and machine for quickly and easily and continuously supplying confection units comprising generally tubular shaped ice cream or the like, with a liquid flavoring syrup deposited internally thereof. Any desired combination of ice cream and syrup may be formed without requiring that the ice cream be served in a container and the syrup supplied externally, as has heretofore been necessary.

The article resulting from the apparatus of the process previously described is illustrated in Fig. 7, which shows the core 36 of frozen flavoring fluid which may be of any desired material susceptible to being reduced at least to plastic form during the filling process, and which has been previously placed in the reservoir 12 or otherwise supplied to the tube 8.

In the modification shown in Fig. 9 the core enclosing portion 37 is preferably of ice cream material, and may consist of a plurality of concentric layers of ice cream or other confection material which may be in different colors. These different layers may be for instance, proceeding from the core outwardly, a layer of white ice cream on a raspberry flavored and colored core, then an enclosing layer of strawberry colored ice cream, and the whole enclosed within a layer of chocolate material which would be first supplied from a reservoir similar to that shown at 12, and heated in the manner indicated for the reservoir 12 or in any other suitable way to cause it to flow through the outer tube 38 shown in Fig. 10, and congealed by contact with the ice cream material.

It will be understood that wherever herein we refer to ice cream material, we use the term in its very broadest sense and within the term may be comprised ices, sherbets, and other confection material which may be reduced to at least plastic form during the carrying out of the process.

In Fig. 10 the concentric tubes are shown in transverse sectional view, the view being considered as taken near the discharge ends of said tube.

Although I have shown and described a preferred embodiment of my invention, I contemplate that numerous and extensive departures may be made therefrom without departing from the spirit of my invention and the scope of the appended claims.

Having thus described my invention, what I claim is:—

1. In an ice cream confection making apparatus, an extrusion nozzle adapted to be secured at one end to an ice cream making apparatus to have ice cream, frozen to plastic consistency, continuously supplied under pressure to said nozzle end and to continuously extrude the ice cream from the other end in the form of a bar, a filler nozzle disposed longitudinally in the extrusion nozzle whereby ice cream in the extrusion nozzle may flow along and over the filler nozzle and have a hollow core formed therein generally of the cross-sectional shape of the filler nozzle, means for continuously supplying flavored filling material to the filler nozzle under pressure to cause it to discharge into and fill the hollow core, and the filler nozzle terminating adjacent to the end of the extrusion nozzle at a point at which the inward expansive force of the ice cream is substantially balanced by the pressure of the filling material at the discharge end of the filler nozzle.

2. The method of continuously making a bar of ice cream having a core filled with flavored material, which includes continuously conducting plastic ice cream under pressure along a confined line of flow while continuously forming a hollow core therein under pressure, continuously conducting unfrozen flavored material along a confined line of flow and continuously discharging it into the hollow core under pressure, and continuously extruding the core filled ice cream out of the confined line of flow directly to the atmosphere in the form of a bar whereby the core is hardened by the chilling effect of the ice cream and causing the pressure of the flavored material at the point of discharge thereof into the core to continuously balance the inward expansive force of the ice cream tending to close the core.

3. An apparatus as described in claim 1 and in which the inside cross sectional area of the extrusion nozzle is substantially uniform from end to end.

4. An apparatus as described in claim 1 and in which the extrusion nozzle is adapted to be secured at one end to the ice cream discharge conduit of an ice cream making apparatus, and the inside cross sectional area of the extrusion nozzle is substantially uniform from end to end of the nozzle and is substantially the same as that of the discharge conduit of the ice cream making apparatus.

5. A nozzle attachment device comprising a nozzle body having means on one end for attaching it to the delivery conduit of a continuous ice cream making machine, the inside cross sectional area of the nozzle being substantially the same from end to end, a filler conduit having a portion longitudinally disposed within the nozzle body and communicating through a wall thereof with an exterior source of filling material under pressure.

6. A nozzle attachment device comprising a nozzle body having means on one end for attaching it to the delivery conduit of a continuous ice cream making machine, the inside cross sectional area of the nozzle being substantially the same from end to end, a filler conduit having a portion longitudinally disposed within the nozzle body and communicating through a wall thereof with an exterior source of filling material under pressure, and the discharge end of the filler conduit terminating adjacent to the end of the nozzle body at a point at which the inward expansive force of the ice cream is substantially balanced by the pressure of the filling material at the discharge end of the filler conduit.

ALBERT E. HERRON.